United States Patent
Zhou et al.

(10) Patent No.: US 7,965,869 B2
(45) Date of Patent: Jun. 21, 2011

(54) SYSTEM AND METHOD FOR DETECTING AND MATCHING ANATOMICAL STRUCTURES USING APPEARANCE AND SHAPE

(75) Inventors: Xiang Zhou, Exton, PA (US); Bogdan Georgescu, Plainsboro, NJ (US); Dorin Comaniciu, Princeton Junction, NJ (US); R. Bharat Rao, Berwyn, PA (US); Alok Gupta, Bryn Mawr, PA (US)

(73) Assignee: Siemens Medical Solutions USA, Inc., Malvern, PA (US)

(*) Notice: Subject to any disclaimer, the term of this patent is extended or adjusted under 35 U.S.C. 154(b) by 269 days.

(21) Appl. No.: 12/401,909

(22) Filed: Mar. 11, 2009

(65) Prior Publication Data

US 2009/0226040 A1    Sep. 10, 2009

Related U.S. Application Data

(62) Division of application No. 10/991,933, filed on Nov. 18, 2004, now Pat. No. 7,536,044.

(60) Provisional application No. 60/523,382, filed on Nov. 19, 2003, provisional application No. 60/551,585, filed on Mar. 9, 2004, provisional application No. 60/565,786, filed on Apr. 27, 2004, provisional application No. 60/581,535, filed on Jun. 21, 2004.

(51) Int. Cl.
*G06K 9/00* (2006.01)
*G06K 9/46* (2006.01)
*G06K 9/36* (2006.01)

(52) U.S. Cl. ........ 382/103; 382/128; 382/203; 382/284; 382/294

(58) Field of Classification Search .............. 382/103, 382/128, 159, 203, 284, 294
See application file for complete search history.

(56) References Cited

U.S. PATENT DOCUMENTS

| | | | |
|---|---|---|---|
| 5,999,651 A * | 12/1999 | Chang et al. | 382/215 |
| 6,937,760 B2 * | 8/2005 | Schoepflin et al. | 382/173 |
| 7,362,899 B2 * | 4/2008 | Rodyushkin et al. | 382/190 |

* cited by examiner

*Primary Examiner* — John Strege

(57) ABSTRACT

A detection framework that matches anatomical structures using appearance and shape is disclosed. A training set of images are used in which object shapes or structures are annotated in the images. A second training set of images represents negative examples for such shapes and structures, i.e., images containing no such objects or structures. A classification algorithm trained on the training sets is used to detect a structure at its location. The structure is matched to a counterpart in the training set that can provide details about the structure's shape and appearance.

27 Claims, 8 Drawing Sheets

SYSTEM AND METHOD FOR DETECTING AND MATCHING ANATOMICAL STRUCTURES USING APPEARANCE AND SHAPE

CROSS REFERENCE TO RELATED APPLICATIONS

This application is a divisional of U.S. application Ser. No. 10/991,933, filed Nov. 18, 2004 and claims the benefit of U.S. Provisional Application Ser. No. 60/523,382, filed on Nov. 19, 2003, U.S. Provisional Application Ser. No. 60/551,585, filed on Mar. 9, 2004, U.S. Provisional Application Ser. No. 60/565,786, filed on Apr. 27, 2004, and U.S. Provisional Application Ser. No. 60/581,535, filed on Jun. 21, 2004 which are incorporated by reference in their entirety.

FIELD OF THE INVENTION

The present invention is directed to a system and method for detecting and matching objects using appearance and shape, and more particularly, to a system and method for detecting and matching anatomical structures using off-line training, on-line detection, and appearance and shape matching.

BACKGROUND OF THE INVENTION

It is very common during medical examinations for medical imaging systems (e.g., ultrasound imaging systems) to be used for the detection and diagnosis of abnormalities associated with anatomical structures (e.g., organs such as the heart). Many times, the images are evaluated by a medical expert (e.g., a physician or medical technician) who is trained to recognize characteristics in the images which could indicate an abnormality associated with the anatomical structure or a healthy anatomical structure.

Because of the advancements in computer technology, most computers can easily process large amounts of data and perform extensive computations that can enhance the quality of the obtained images. Furthermore, image processing can be used as a tool to assist in the analysis of the images. Efficient detection of anatomical structures or objects of interest in an image is an important tool in the further analysis of that structure. Many times abnormalities in the shape of an anatomical structure or changes of such a shape through time (e.g., a beating heart or a breathing lung) indicate a tumor or various diseases (e.g., dilation or ischemia of the heart muscle).

This type of image processing can be used for other applications such as the detection of human faces in an image. Because of the variables associated with different facial features (e.g., hair color and length, eye color, facial shape, etc.), facial detection is not a trivial task. Face detection can be used in a variety of applications such as user recognition, surveillance or security applications.

Various types of approaches have been used to detect objects of interest (e.g., anatomical structures or faces). Component-based object detectors (eye detector and mouth detector, etc.) can deal with large variations in pose and illumination, and are more robust under occlusions and heteroscedastic noise. For example, in echocardiogram analysis, local appearance of the same anatomical structure (e.g., the septum) is similar across patients, while the configuration or shape of the heart can be dramatically different due to, for example, viewing angles or disease conditions. Likewise, in face detection, general spatial relationships between facial features are fairly consistent (e.g., general location of eyes to nose and mouth), while the configuration and shape of the various facial features (e.g., shape of eyes, expression of mouth, and relative distances among them) can vary significantly.

For capturing local appearance variations, many solutions rely on a Gaussian assumption. Recently, this assumption has been relaxed through the use of nonlinear learning machines such as Support Vector Machines (SVM) or boosting. Some of the most successful real-time object detection methods are based on boosted cascade of simple features. By combining the response of a selected number of simple classifiers through boosting, the resulting strong classifier is able to achieve high detection rates and is capable of processing images in real-time. However, the existing methods do not address the detection problem under the presence of occluding objects. The erroneous response of a simple or weak classifier due to occlusion will negatively influence the detection outcome.

For most visual tracking applications, measurement data are uncertain and sometimes missing: images are taken with noise and distortion, while occlusions can render part of the object-of-interest unobservable. Uncertainty can be globally uniform; but in most real-world scenarios, it is heteroscedastic in nature, i.e., both anisotropic and inhomogeneous. A good example is the echocardiogram (ultrasound heart data). Ultrasound is prone to reflection artifacts, e.g., specular reflectors, such as those that come from membranes. Because of the single "view direction"; the perpendicular surface of a specular structure produces strong echoes, but tilted or "off-axis" surfaces may produce weak echoes, or no echoes at all (acoustic "drop out"). For an echocardiogram, the drop-out can occur at the area of the heart where the tissue surface is parallel to the ultrasound beam.

Due to its availability, relative low cost, and noninvasiveness, cardiac ultrasound images are widely used for assessing cardiac functions. In particular, the analysis of ventricle motion is an efficient way to evaluate the degree of ischemia and infarction. Segmentation or detection of the endocardium wall is the first step towards quantification of elasticity and contractility of the left ventricle. Examples of some existing methods include pixel-based segmentation/clustering approaches (e.g., Color Kinesis), variants of optical flow, deformable templates and Markov random process/fields, and active contours/snakes. Some methods are employed in 2-Dimensional, 3-Dimensional or 4-Dimensional (3D+time) space.

However, most existing segmentation or detection methods do not attempt to recover accurate regional motions of the endocardial wall, and in most cases, motion components along the wall are ignored. This simplified treatment is also employed by contour trackers that search only along the normals of the current contour. This is not suitable for regional wall abnormality detection, because regional motion of an abnormal left ventricle is likely to be off the normal of the contour, not to mention that global motion, such as translation or rotation (due to the sonographer's hand motion or respiratory motion the patient), causes off-normal local motion on the contour as well. It is desirable to track the global shape of endocardial wall as well as its local motion, for the detection of regional wall motion abnormalities. This information can be used for further diagnosis of ischemia and infarction. There is a need for a detection framework that matches anatomical structures using appearance and shape.

SUMMARY OF THE INVENTION

The present invention is directed to a detection framework that matches anatomical structures using appearance and shape. A training set of images are used in which object shapes or structures are annotated in the images. A second training set of images represents negative examples for such shapes and structures, i.e., images containing no such objects or structures. A classification algorithm trained on the training sets is used to detect a structure at its location. The structure is matched to a counterpart in the training set that can provide details about the structure's shape and appearance.

Another aspect of the present invention is directed to a method for detecting an object in an image that contains invalid data regions. A data mask for the image is determined to indicate which pixels in the image are valid. The data mask is represented as an integral mask in which each pixel has a value corresponding to a total number of valid pixels in the image above and to left of the pixel. A rectangular feature is applied to the image which has at least one positive region and one negative region. A determination is made as to those pixels in the rectangular feature that are valid using the integral mask. A mean intensity value for a region that contains invalid pixels is approximated. A feature value for the rectangular feature is determined by computing a weighted difference between a sum of intensity values in the positive and negative regions of the rectangular feature. The feature value is used to determine if an object has been detected.

Another aspect of the present invention is directed to a method for detecting an object in an image. A feature value is computed for a classifier in a window of the image. A determination is made as to whether the feature value is above a predetermined threshold value. If the feature value is above the threshold value, a subsequent feature value is computed for a subsequent classifier in the window of the image. The value of the feature value and the subsequent feature value are combined. A determination is made as to whether the combined feature value is above a combination threshold value for a current combination. If the combined feature value is above the combination threshold value, further combined feature values are computed that include further subsequent classifiers until there are no subsequent classifiers or the combined feature value is not above the combination threshold value. A final combined feature value is used to determine if an object has been detected.

Another aspect of the present invention is directed to a system and method for detecting and matching anatomical structures in an image to one or more anatomical structures in a training set of images. A candidate image is received and feature values are extracted from the candidate image. A classification function is applied to detect an anatomical structure. If an anatomical structure is detected, one or more counterpart images in the training set of images are identified by matching the extracted feature values for the candidate image to feature values of the counterpart images in the training set. A shape of an anatomical structure in a matching counterpart image from the training set is used to determine a shape of the anatomical structure in the candidate image.

Another aspect of the present invention is directed to a method for matching an anatomical structure in an image to one or more similarly shaped anatomical structures in a training set of images. An image of a candidate anatomical structure is received and features from the image are extracted. Features associated with similarly shaped anatomical structures are compared to the candidate anatomical structure. A determination is made of the shape of the candidate anatomical structure by using the shape of at least one nearest neighbor from the training set.

Another aspect of the present invention is directed to a system and method for detecting and tracking a deformable shape of a candidate object in an image. The shape is representing by a plurality of labeled control points. At least one control point of the deformable shape in an image frame is detected. For each control point associated with the candidate object, a location uncertainty matrix is computed. A shape model is generated to represent dynamics of the deformable shape in subsequent image frames in which the shape model comprises statistical information from a training data set of images of representative objects. The shape model is aligned to the deformable shape of the candidate object. The shape model is fused with the deformable shape, and a current shape of the candidate object is estimated.

BRIEF DESCRIPTION OF THE DRAWINGS

Preferred embodiments of the present invention will be described below in more detail, wherein like reference numerals indicate like elements, with reference to the accompanying drawings.

DETAILED DESCRIPTION

The present invention is directed to a method for detecting and matching anatomical structures. An example where such a method would be utilized is for to detecting regional wall motion abnormalities in the heart by detection and segmentation of the ventricle endocardial or epicardial borders through machine learning, or classification, and by identifying similar cases from annotated databases. It is to be understood by those skilled in the art that the present invention may be used in other applications where shape detection and matching is useful such as, but not limited to, recognizing human features such as facial features or other body features.

The present invention can also be used in 2 dimensional, 3 dimensional and 4 dimensional (3D+time) data analysis, such as medical analysis of anatomical structures such as the heart, lungs or tumors, which can be evolving over time.

Figure 1:
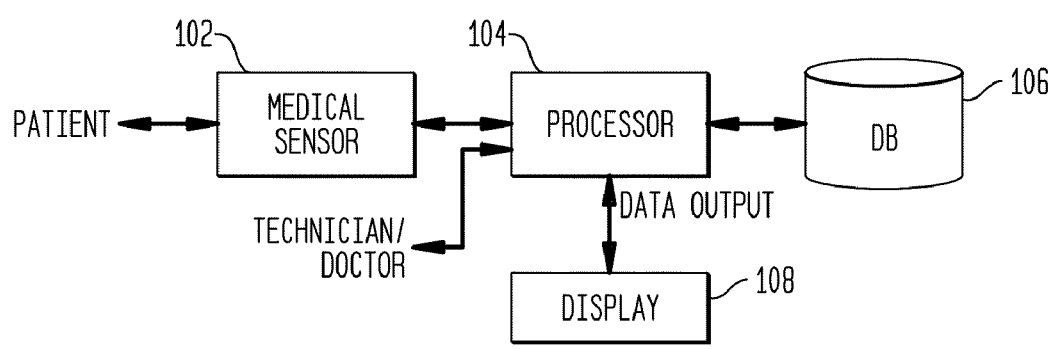
FIG. 1 illustrates an exemplary architecture of an echocardiograph system that uses a method for detecting and tracking the shape of an endocardial wall of a left ventricle in accordance with the present invention.

For purposes of describing the present invention, an example will be described for detecting the endocardial wall of the left ventricle of a human heart. FIG. 1 illustrates an exemplary architecture of an echocardiograph system that uses a method for detecting an endocardial wall of a left ventricle using shape and appearance in accordance with the present invention. A medical sensor 102, such as an ultrasound transducer is used to perform an examination on a patient. The sensor 102 is used to obtain medical measurements consistent with a particular medical examination. For example, a patient experiencing heart problems may have an echocardiogram performed to help diagnose the particular heart ailment. An ultrasound system provides two-, three-, and four (3D+time)-dimensional images of the heart from various perspectives.

The information obtained by the sensor 102 is communicated to a processor 104 which may be a workstation or personal computer. The processor 104 converts the sensor data into an image that is communicated to display 108. The display 108 may also communicate other graphical information or tables of information relating to the image. In accordance with the present invention, the processor 104 is also provided with data representing an initial contour of the endocardial wall. The data may be provided manually by a user such as a physician or sonographer, or automatically by the processor 104. The contour comprises a series of individual points, the movement of which is tracked by the processor 104 and illustrated on display 108.

In addition to data from the medical sensor 102, the processor 104 may also receive other data inputs. For example, the processor may receive data from a database 106 associated with the processor 104. Such data may include subspace models that represent potential contour shapes for the endocardial wall. These subspace models may be images of left ventricles that are representative of a plurality of patients or may be computer generated models of contour shapes based on statistical information. The processor 104 tracks the individual points of the contour shape using known approaches such as Bayesian kernel matching or optical flow-based methods. Error accumulation during tracking is remedied by using a multi-template adaptive matching framework. Uncertainty of tracking is represented at each point in the form of a covariance matrix, which is subsequently fully exploited by a subspace shape constraint using a non-orthogonal projection.

Figure 2:
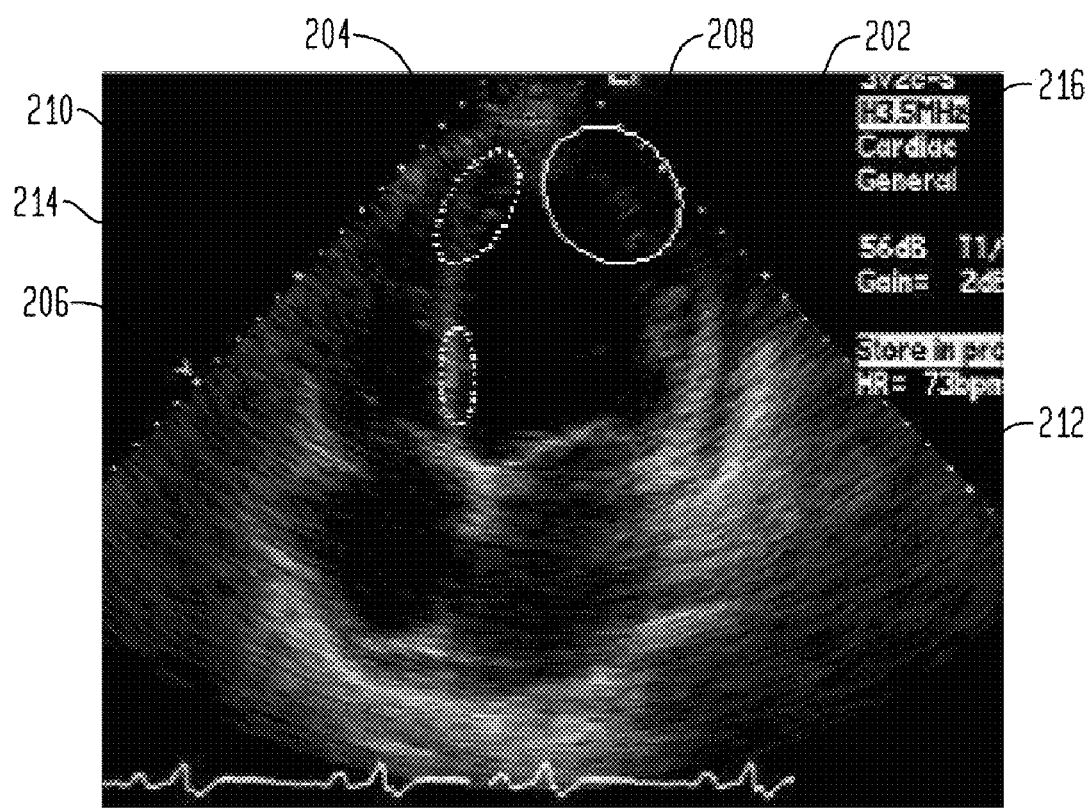
FIG. 2 illustrates a typical echocardiograph image of a heart.

FIG. 2 illustrates a typical echocardiograph image of a heart. The part of the endocardial wall of the left ventricle that has acoustic drop out is marked by solid ellipse 208. Estimations of local wall motion are depicted by the dotted ellipses 202, 204. Because of the acoustic drop out, the endocardium wall is not always at the strongest edge in the image. A characteristic of the echocardiograph image is the fan shape of the image as indicated by dotted lines 210, 212. The area outside of the fan does not contain useful data.

Many detection methods use the boosting of weak classifiers or features to detect an object in an image. By combining the response of a selected number of weak classifiers through boosting, a resulting strong classifier is able to achieve high detection rates. However, known methods do not address the problem of detecting an object in the presence of other occluding objects (e.g., the data outside of the fan). The erroneous response of a weak classifier due to occlusion negatively influences detection of an object.

In accordance with one aspect of the present invention, a method for eliminating the influence of known occlusions during object detection will now be described. For example, an echocardiograph image can be processed in a way that the image data outside of the fan (i.e., the non-useful or invalid data) is not considered. In other words, the data external to the fan is treated as an occlusion.

Figure 3A:
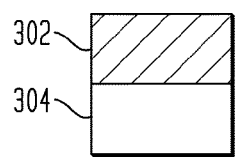
FIGS. 3a-3d illustrate examples of rectangle features representative of weak classifiers in accordance with the present invention.
Figure 3B:
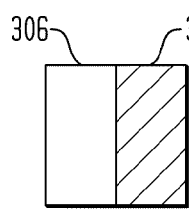
Figure 3C:
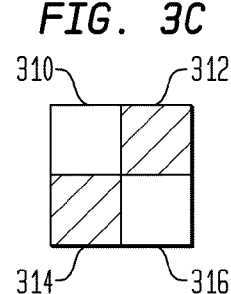
Figure 3D:
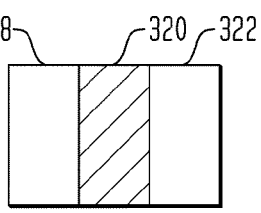

Simple features associated with the image of the object are identified as weak classifiers. Examples of such features are the rectangular features illustrated in FIGS. 3a-3d. The value of each rectangular feature is the difference between the sums of pixel intensities in the white (also referred to as positive) regions and gray (also referred to as negative) regions of each rectangle. For the rectangular feature illustrated in FIG. 3a, the negative region is 302 and the positive region is 304. For the rectangular feature illustrated in FIG. 3b, the negative region is 308 and the positive region is 306. For the rectangular feature illustrated in FIG. 3c, the negative regions are 312 and 314 and the positive regions are 310 and 316. For the rectangular feature illustrated in FIG. 3d, the negative region is 320 and the positive regions are 318 and 322.

Figure 4:
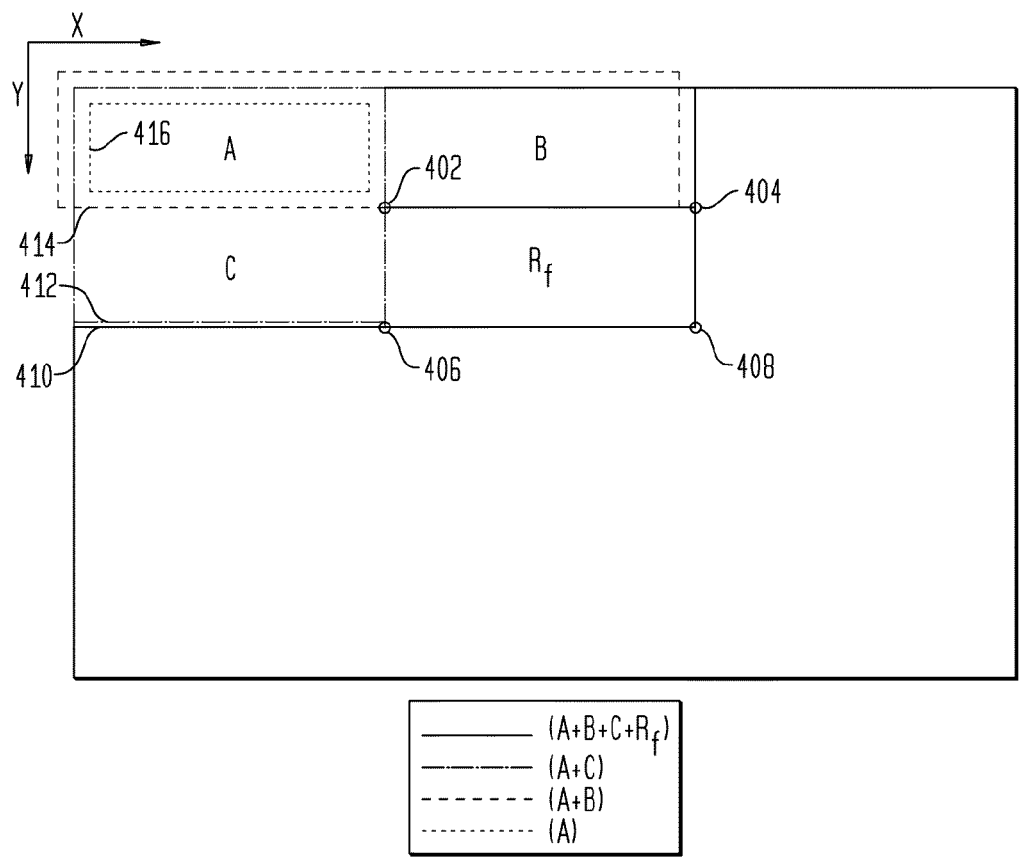
FIG. 4 illustrate a method for using an integral image to determine a sum of intensities for a given window in accordance with the present invention.

Rectangle features provide an over complete basis for a base region. For example, if the rectangle is 24×24 pixels in size, the number of features is 180,000. One of the advantages of rectangle features is computational speed. By using an intermediate representation known as an Integral Image (II) as shown in FIG. 4, a feature value can be calculated with a small fixed number of operations.

The II for an input image (e.g., an echocardiograph image of a left ventricle) is pre-calculated prior to the calculation of rectangular features. For each pixel (x,y) in II, an intensity value is determined. These intensity values are stored in database 106 (FIG. 1). Once the II has been computed for the input image, all future calculations are greatly simplified. For each pixel at a location $(x_o, y_o)$ in the input image, an intensity value can be computed by determining the sum of intensities of all pixels that are above and to the left of location $(x_o, y_o)$. In other words, a subset of the II can be determined at II $(x_o, y_o)$ as follows:

$$II(x_0, y_0) = \sum_{x \leq x_0, y \leq y_0} I(x, y), \quad (1)$$

where I(x,y) is the intensity of the pixel at location (x,y).

FIG. 3 illustrates how the computation of the intensity value for the II at rectangle feature $R_f$ is determined. An II at location 408 is computed which is equal to the area inside solid line 410. Another way to define the II at location 408 is the sum of intensity values for rectangles $(A+B+C+R_f)$. In order to obtain the sum for $R_f$, additional computations must be made. The II for location 406 provides the sum for the area defined by line 412 which is equal to the sum of intensity values for rectangles (A+C). Subtracting the II for location 406 from the II for location 408 results in the II' for the rectangles $(B+R_f)$. Next, the II for location 404 is computed which provides the sum for the area defined by (A+B). Subtracting the II for location 404 from II' results in the II" for the rectangles $(-A+R_f)$. Finally, the II for location 402 is added to II" which provide the sum for $R_f$.

Figure 5:
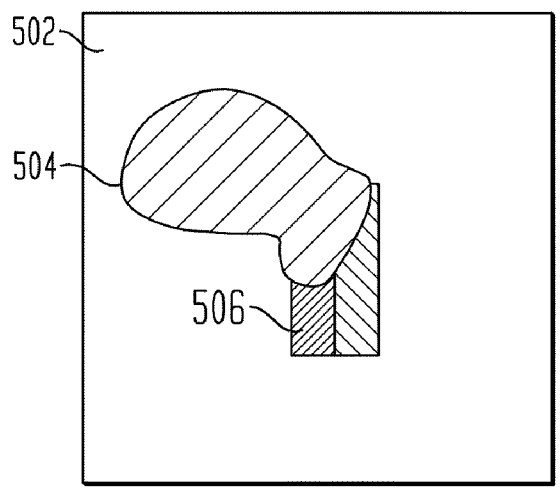
FIG. 5 illustrates a rectangular feature in an integral image that is partially occluded in accordance with the present invention.

However, in the instance where pixels in $R_f$ include occlusions, the intensity values for those pixels provide invalid values which will ultimately yield an incorrect estimate for the rectangular feature. FIG. 5 illustrates an example of an integral image 502 that includes an occlusion 504. A rectangular feature 506 is placed at a location that includes part of the occlusion 504.

Figure 6:
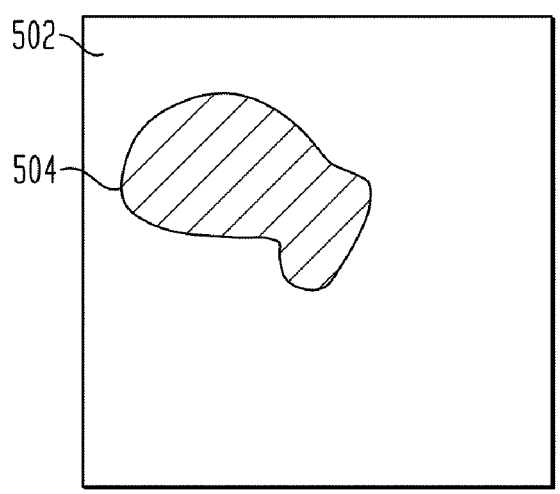
FIG. 6 illustrates an occlusion mask for the integral image of FIG. 5 in accordance with the present invention.

In accordance with the present invention, an occlusion mask is used to eliminate the contribution of the pixels contained in the rectangular feature that are occluded. An example of an occlusion mask for the II of FIG. 5 is shown in FIG. 6. The occlusion mask can be used when images are taken in controlled environments or it can be inferred from the data. For example, in surveillance applications, the static background is known (e.g., the location of doors, walls, furniture, etc.). The likelihood of objects in the background causing occlusions can be determined and used to create the occlusion mask. Another example is an ultrasound image. In an ultrasound image the fan location is either given by the ultrasound machine, or can be computed, e.g., analysis of time variations can yield static invalid regions. Once the fan is identified, an occlusion mask can be created to effectively exclude or nullify the presence of the fan in II computations.

By setting the intensity value for occluded or otherwise invalid pixels to zero, the sum of intensity values for the rectangle will no longer be influenced by incorrect values. However, because there is now "missing" data, the sum will be unbalanced. When there are no missing values, the rectangle sum is proportional to the mean intensity value for the rectangle. Therefore, to compensate for the missing values, the mean value is approximated by using the number of pixels having valid intensity values when the occlusion is present. The number of valid pixels can be found by first computing an equivalent map or occlusion mask.

The occlusion mask M is comprised of Boolean values where valid pixels are assigned a value of 1 and invalid or occluded pixels are assigned a value of 0. An integral mask can be computed using the number of valid pixels above and to the left of the current location $(x_o, y_o)$ as follows:

$$IM(x_0, y_0) = \sum_{x \le x_0, y \le y_0} M(x, y). \qquad (2)$$

Similar to the II of equation (1), the number of valid pixels in a rectangle can be computed from the integral mask in the same number of operations as described above.

The equivalent feature value for the rectangular feature 506 will be given a weighted difference between the sum of intensities in the positive and negative image regions. If $R_+$ denotes the region where the pixel intensities contribute with a positive value and $R_-$ denotes the region where the pixel intensities contribute with a negative value, the feature value f is as follows:

$$f = \frac{n_-}{N} \sum_{(x,y) \in R_+} I(x, y) - \frac{n_+}{N} \sum_{(x,y) \in R_-} I(x, y), \qquad (3)$$

where $n_-$, $n_+$ denote the number of valid pixels for negative and positive regions respectively, each containing N pixels. If both $n_-$ and $n_+$ are non-zero, the final feature value is normalized by $N/(n_- n_+)$. By using the occlusion mask to calculate the integral image for the rectangular feature, more accurate results are obtained which result in better object detection.

Because of the large number of features or components that need to be calculated for the detection of objects, particularly in the case of complicated objects such as faces or anatomical structures, tools are used to reduce the amount computation required while still yielding accurate results. One such tool which is commonly used is boosting. In general, boosting identifies a plurality of weak classifiers or features. For each weak classifier a value can be computed which is then compared to a predefined threshold. If the value for the weak classifier is above the threshold, the classifier is retained. If the value for the weak classifier is below the threshold, the classifier is rejected. By weighted-summing all the values for the weak classifiers that exceeded the threshold, a strong classifier can result which can be used in object detection.

A variation of boosting is a boosted cascade. In this technique, classifiers are prioritized. A first classifier is computed for a window and if it does not meet the threshold then the window is moved to another location. Only those locations in which the classifiers that are computed exceed the threshold are retained. The threshold is typically set at a modest level to allow for a generous margin of error. By reducing the number of locations in which the computations are performed the method is efficient. However, these methods discard the outputs from previous classifiers. The training for the next stage starts with uniform weighting on the new set of examples.

Figure 7A:
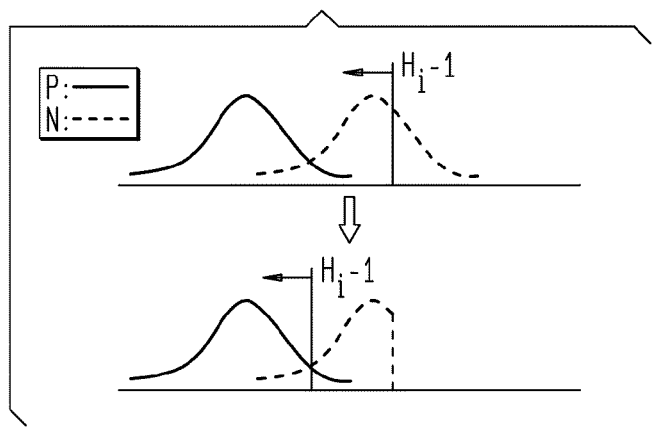
FIGS. 7a and 7b illustrate the relationship of $H_{i-1}$ and $H_{i-1}{}^*$ in accordance with the present invention.
Figure 7B:
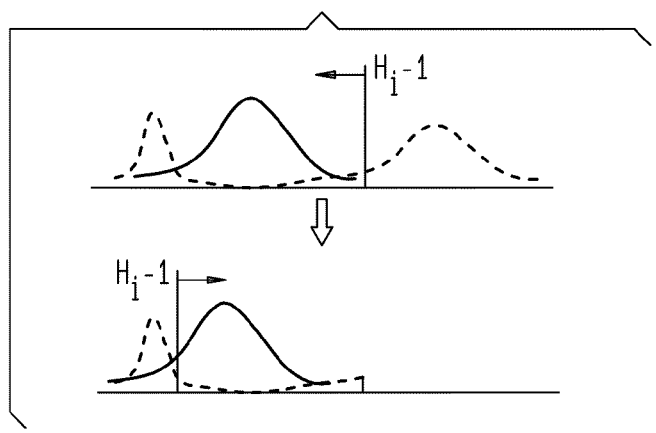

In accordance with the present invention, the values for each computed classifier are retained and used in the calculation of future classifiers in order to strengthen the classifier computations at later stages. An intermediate strong classifier $H_{i-1}$ is used directly from the previous stage of the cascade by setting a new threshold $T_i^*$, and the associated parity $p_i^*$ over the new training set for the current stage as illustrated in FIGS. 7a and 7b. The training examples are then weighted by the errors of a new classifier $H_{i-1}^*$ before the training based on the raw features. The strong classifier for the current stage is a weighted sum of $H_{i-1}^*$ and the selected single-feature classifiers. During detection, instead of throwing away the classifier output from the previous stage, it is thresholded using $T_i^*$ and the associated parity $p_i^*$, and weighted according to its errors, and added to the weighted sum of outputs from the single-feature weak classifiers of the current stage.

A general "boosted cascade with memory" (BCM) training algorithm can be describes as follows:

---

The initial cascade classifier in memory: $H_0^* = $ NULL; with error $\epsilon = \infty$.
P = set of positive examples, N = set of negative examples;
i = 0;
Loop through the stages i of the cascade:
    i++;
    Use P and N to train a classifier $H_i$ with $H_{i-1}^*$ and a certain number of additional
        features using AdaBoost, so that the required false positive and false detection
        rates are satisfied;
    Reconstruct the training set, P→ P* and N→ N*, by using the false positives of $H_i$ as
        the negative examples, and adjust the positive set if needed;
    Re-train $H_i$: Modify $H_i$ (e.g., by selecting an optimal threshold $T_i^*$ and a parity $p_i^*$) to
        minimize its classification error on the new training data P* and N*. Put the
        resulting $H_i^*$ and its outputs in memory.

In the above algorithm, it is assumed that if $H_{i-1}*$ is used, it will be the first. $H_{i-1}*$ can also be used in the middle of other single-feature weak classifiers. All that needs to change is to learn the new threshold and parity during the training of the current stage instead of at the end of the previous stage.

The evaluation of $H_i$ can be done using either the current training set, or a fully representative validation set. In the former case, only $H_i$ is used and the goal is to satisfy the performance goal of the current stage (say, 95% per stage); while in the latter case, the overall cascade classifier should be used, and the goal is the composite performance goal up to the current stage i (say, $0.95^i$).

Another example of a boosted cascade algorithm with memory is shown below.

---

User selects values for f, the maximum acceptable false positive rate per layer and d,
    the minimum acceptable detection rate per layer.
User selects target overall false positive rate $F_{target}$.
P = set of positive examples, N = set of negative examples
$F_0 = 1.0$; $D_0 = 1.0$; i = 0;
The initial cascade classifier in memory: $H_0* $ = NULL;
While $F_i > F_{target}$
    i++
    $n_i = 0$; $F_i = F_{i-1}$
    while $F_i > f \times F_{i-1}$
        $n_i$++
        Use P and N to train a classifier $H_i$ with $H_{i-1}*$ and $n_i$ additional features using
            AdaBoost (When i >1, $H_{i-1}*$ has already been trained with results stored in
            memory; if it is stronger than the features, select $H_{i-1}*$ as a weak classifier
            for stage i. Use the errors of $H_{i-1}*$ to update the weights on the training
            examples for the selection of remaining weak classifiers based on the
            features.)
        Evaluate current cascaded classifier $H_i$ on validation set to determine $F_i$ and $D_i$
        Decrease threshold ($T_i$) for the $i^{th}$ classifier $H_i$ until the current cascaded
            classifier has a detection rate of at least $d \times D_{i-1}$ (this also affects $F_i$)
N = Ø
If $F_i > F_{target}$ then evaluate the current cascaded detector $H_i$ on the set of non-face
images and put any false detections into the set N.
Re-train $H_i$: Select a second optimal threshold $T_i*$ and a parity $p_i*$ for $H_i$ to minimize
its classification error on the new training data P and N; put the resulting $H_i*$ and its
outputs in memory.

---

In the BCM framework, the detection process uses the following intermediate strong classifiers for each stage of the cascade:

---

Stage 1-    $H_1: \alpha_1 h_1 + \alpha_2 h_2 + \ldots \alpha_{n1} h_{n1}$
Stage 2-    $H_2: \alpha_{H1} p_1* (H_1 - T_1*) + (\alpha*_{n1+1} h_{n1+1} + \alpha_{n1+2} h_{n1+2} + \ldots$
            $\alpha_{n1+n2} h_{n1+n2})$
. . .

---

Figure 8:
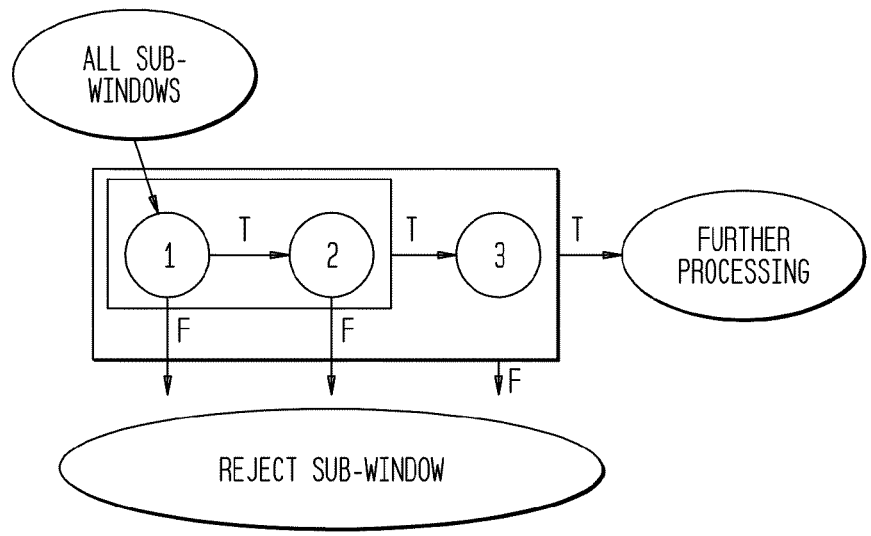
FIG. 8 illustrates a schematic diagram of a boosted cascade with memory technique in accordance with the present invention.

Because $H_i$ has already been evaluated in the previous stage, the added computation is only a subtraction and a multiplication for each additional stage that the current test sample will go through as illustrated in FIG. 8. For each additional classifier that is considered, the value associated with the previously computed classifiers are taken into consideration and integrated with the value for the additional value. The resulting value is then compared to a threshold. The end result is a value that provides a more accurate indication of object detection.

Once an object has potentially been detected, further processing techniques can be used to obtain additional information about the image. In accordance with another aspect of the present invention, the joint use of appearance and shape can be applied based on a set of training images to match and detect object shapes or anatomical structures in test images. Appearance is used for localization of the object or structure in the test image. A matching technique is then employed to find similar cases from positive training datasets and to provide the shape or structural details for the detected candidate. The detection, localization and matching can be done in a hierarchical fashion to achieve more accurate results. The matching technique uses features learned during the detection process to save computation time and to improve matching performance.

In accordance with the present invention, a general framework for object or anatomical structure detection and shape recovery comprises three stages: an off-line training stage, an on-line detection stage and a matching stage.

In the off-line training stage, positive training examples are stored as a training data set. For example, in the case of echocardiography, the training set would comprise images of the left ventricle of the human heart. The training set would include a comprehensive set of examples of various shaped left ventricles as well as examples of abnormal left ventricles. Preferably, the images in the training set are shown in optimal conditions (e.g., the left ventricle is centered in the image; the image is normalized to eliminate the effects of size and rotation, etc.). During the training stage, both boosting algorithms are applied to the images. The data obtained from these applications are stored along with the training data and can include feature vectors indicating weak classifier outputs.

All positive training examples are processed to maintain invariant properties. For example, global translation, rotation and scale are invariant transformations for a left ventricle of a human heart. The alignment of positive data directly influences the design of the detector, that is, each alignment axis needs to be expanded during detection. In other words, for example, if rotations are canceled out in the training data, the detector has to search multiple rotations during detection. With aligned training data, a learning algorithm outputs selected features and the corresponding decision function for positive/negative classification. In accordance with the present invention, all of the training data can be transformed (e.g., scaling and rotation) to train transformed detectors.

All of the features for the training data, including the transformed training data are stored in database 106 (FIG. 1). In addition, feature vectors are computed for each positive data image which include weak classifier outputs and their associated weights. Each weak classifier represents a component associated with the object. The feature vectors for the positive data can later be compared to feature vectors calculated for the test image to help identify positive data that has similar characteristics. Location points corresponding to points along the contour of the object for each positive data image are also stored and used in the shape matching stage.

In the on-line detection stage, a scanning scheme for the image or data volume is employed through translating, rotating and/or scaling a window or cube inside the testing image or data volume to yield candidate data patches. For each candidate, the object location, scale and/or rotation is reached either during or after the whole scanning process. In some cases, applying multiple transformed detectors is faster than transforming the candidate. A boosting-based detector can be used to indicate the object or candidate location in the image.

In the shape matching stage, those candidates which appear to contain objects (winning candidates) are identified. A similarity matching algorithm is applied to these candidates to retrieve nearest neighbors from corresponding training datasets and apply their associated shape to the candidates. A feature vector is used for shape matching that is based on the weak classifier output $h_i$'s and their associated weights $\alpha_i d$'s. Matching is done using a distance metric in the following space: $\{\alpha_1, h_1, \alpha_2, h_2, \ldots, \alpha_K h_K\}$, where K is the number of weak classifier features. Other feature space can also be used. The shape matching algorithm searches for a "counterpart" feature vector that is associated with one or more of the images in the training data. Once a match has been obtained, the data from the associated matched image in the training set can be used to provide details regarding the object shape and structure.

Figure 9:
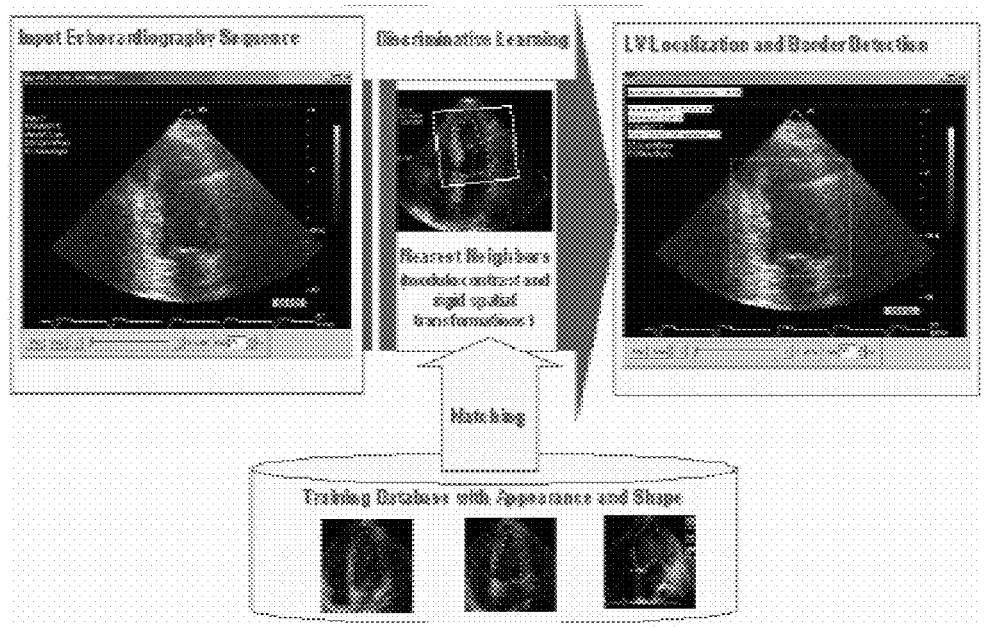
FIG. 9 illustrates a framework for left ventricle endocardial border detection in accordance with the present invention.

An example will now be described using two dimensional (2D) data. It is to be understood by those skilled in the art that the present invention can also process three dimensional (3D) data and four dimensional (3D+Time) data. FIG. 9 illustrates an exemplary framework of Left Ventricle (LV) endocardial border detection based on learning and matching using an annotated dataset of LV frames, with the original images and traced endocardial borders.

This framework first constructs a database of aligned LV patches (modulo translation, scale and rotation), with its borders annotated, in the form of, for example, ordered set of landmark or control points. A detection algorithm is designed and trained using this set of examples and other negative patches. For example, a boosting-based feature selection and classifier construction algorithm can be used. Feature vectors are computed for all the examples.

This framework then employs a learned detection algorithm for the localization of the LV. The detected candidate(s) are local patch(es) containing a LV, with its proper size and rotation. (The size and rotation are determined by scanning the image at multiple possible scales and rotations.)

Finally, feature vectors are extracted from the detected candidate, and compared to the database to find one or more nearest neighbors. Their contours are then combined, for example, using a weighted sum where the weights are inverse proportional to their matching distances to the detected patch, to form the contours for the detected candidate patch. One possible feature type would be the image intensities inside the patch, with or without subsampling. Other features include the weak classifier outputs, with or without weighting factors. One can also use Principal Component Analysis to select a subset of such features.

Figure 10:
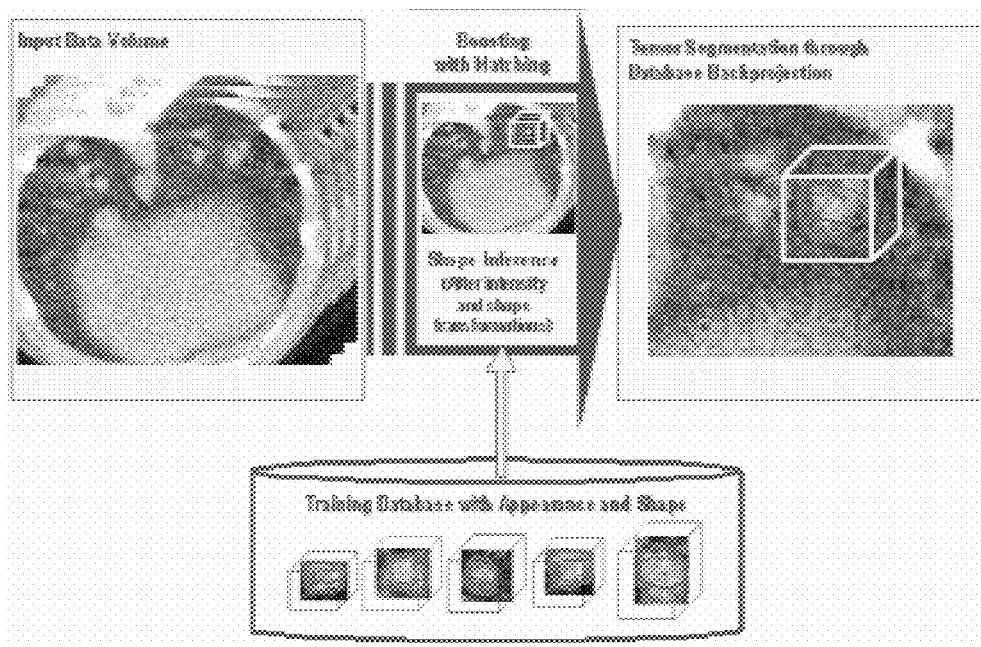
FIG. 10 illustrates a framework for detecting a tumor in a three dimensional data volume in accordance with the present invention.

FIG. 10 illustrates an example of tumor detection in a three dimensional data volume. The method is similar to that described above, except that 3D neighborhoods, 3D features and 3D scanning are used to detect a match.

Once an object has been detected and matched in shape and appearance, the object's shape can then be tracked over time. Such tracking is important in echocardiography because of the rhythmic movement of the heart muscle. Measurement uncertainty plays an important role during shape tracking. In accordance with the present invention, individually trained component detectors are applied to an image to exploit relatively stable local appearances, while using global shape models to constrain the component fusion process. A uniformed framework will now be described for optimally fusing uncertainties from local detection, motion dynamics and subspace shape modeling during automatic shape detection and tracking. Boosted component detectors are used for left ventricle border localization in echocardiography sequences.

Given detection of a candidate pre-shape denoted by $N(x, C_x)$, a multidimensional Gaussian distribution, with mean x and covariance $C_x$, the first step is to find among the sample pre-shapes $x^o$ the one that has maximum likelihood of being generated jointly by $N(x,C_x)$, the shape model $N(m,C_m)$, and the predicted shape $N(x_-,C_{x_-})$ from previous time step, under an optimal invariant transform. An equivalent formulation is to find x* to minimize the sum of Mahalanobis distances in the pre-shape space and the transformed shape space, i.e., $$x^* = \underset{\{T, x^o\}}{\operatorname{argmin}} \, d^2, \qquad (4)$$

$$d^2 = (x^{o\prime} - m)^T C_m^{-1} (x^{o\prime} - m) + \qquad (5)$$
$$(x^o - x)^T C_x^{-1} (x^o - x) + (x^o - x_-)^T C_{x_-}^{-1} (x^o - x_-),$$

where $x^{o\prime} = T(x^o)$ with T being the invariant transform.

With multiple candidate pre-shapes, the one producing the highest likelihood, considering also the likelihood value in the detection map, wins at the decision time. Eq. (5) requires simultaneous optimization over the location and the transform, and does not have a close-form solution even for simple transforms such as the similarity transform permitting only translation, rotation, and scaling. The global optimal can be sought numerically through iterations, but the computation can be too expensive.

Figure 11:
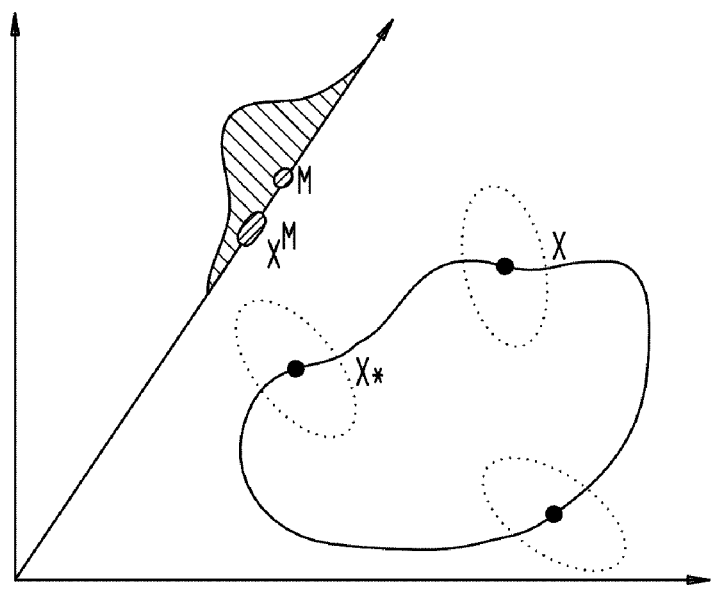
FIG. 11 illustrates an invariance manifold for shape alignment in accordance with the present invention.

The difficulty stems from the fact that the manifold (i.e., the shape) spanned by an arbitrary pre-shape through all possible transforms does not intersect the shape subspace in general, especially when the subspace dimension is relatively small. In the present invention, the shape sub-space has dimensions from 6 to 12, while the full Euclidean space has dimensions $\geq 34$. FIG. 11 illustrates an invariance manifold for shape alignment that conceptually shows this relationship, with the thick curve 1102 depicting the manifold spanned by a pre-shape vector X, and the slanted axis 1104 and a one dimensional Gaussian distribution 1106 representing the subspace model. In general, the manifold will not intersect the shape model subspace (i.e., the slanted axis 1104 containing the model centroid M). The prediction is omitted here, or you may regard X as the fusion result of the detection and prediction. The present invention is directed to a two-step optimization scheme as the overall solution, with close-form solutions for both steps. This scheme can be easily explained with reference to FIG. 11: The first step is to go from X to X*, or in other words, to find the optimal transform from X to M, using information in $C_x$. The second step is to go from X* to $X^M$, using additional information from $C^M$. The first step is referred to as the alignment step, and second step is referred to as the constraining step.

The goal of the alignment step is to consider component uncertainties during the transform of the pre-shape and its covariance matrix toward the model. First, $d^2$ is minimized as follows:

$$d^2 = (m-x')^T C'^{-1}_x (m-x') \quad (6)$$

where $x'=T(x)$ and $C'_x=T(C_x)$. To simplify notations, it is assumed that the prediction $N(x_-,C_{x-})$ has been fused into $N(x,C_x)$.

When T is the similarity transform, we have:

$$x'=x-t \quad (7)$$

where t is the translation vector with two free parameters and R is a block diagonal matrix with each block being $$R_i = \begin{pmatrix} a & -b \\ b & a \end{pmatrix} \quad (8)$$

With straight algebra we can rewrite Eq. (6) as follows:

$$d^2 = (R^{-1}(m-t)-x)^T C_x^{-1}(R^{-1}(m-t)-x) \quad (9)$$
$$= (T^{-1}(m)-x)^T C_x^{-1}(T^{-1}(m)-x)$$

Figure 12A:
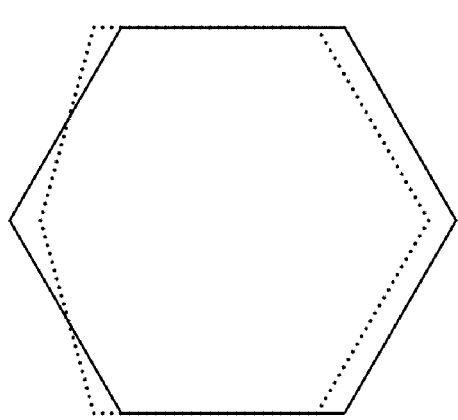
FIGS. 12a and 12b illustrate shape alignment in accordance with the present invention.
Figure 12B:
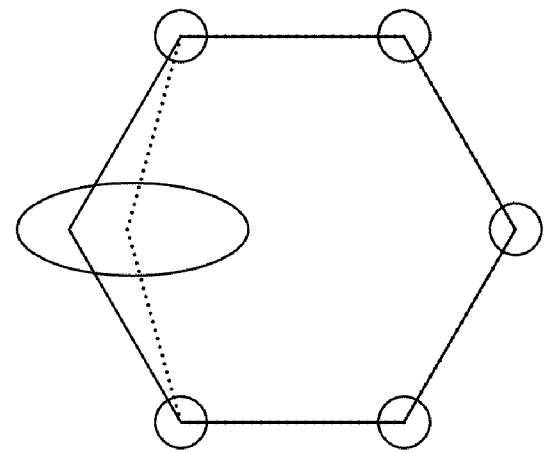

By taking derivative with respect to the four free parameters in R and t, a close-form solution can be obtained. FIGS. 12a and 12b illustrate shape alignment with and without considering uncertainties in point locations. FIG. 12a shows shape alignment without considering uncertainties in localization. FIG. 12b shows shape alignment with heteroscedastic uncertainties. The ellipses 1202-1212 depict the covariance on point locations, representing information in a block diagonal $C_x$. The intuition is to trust more the points with higher confidence.

Once the pre-shape is aligned with the model, a determination is made as to the shape with maximum likelihood of being generated by the two competing information sources, namely, the aligned detection/prediction versus the (subspace) model. With a full-space model, the formulation is directly related to information fusion with Gaussian sources, or BLUE (Best Linear Unbiased Estimator).

Given two noisy measurements of the same n-dimensional variable x, each characterized by a multidimensional Gaussian distribution, $N(x_1,C_1)$ and $N(x_2,C_2)$, the maximum likelihood estimate of x is the point with the minimal sum of revised Mahalanobis distances, $D_2(x_1, x_2,C_2)$. It is assumed that, without loss of generality, C2 is singular. With the singular value decomposition of $C_2=U\Lambda U^T$, where $U=[u_1, u_2 \ldots, u_n]$, with $u_i$'s orthonormal and $\Lambda=\text{diag}\{\lambda_1, \lambda_2, \ldots, \lambda_p, 0, \ldots, 0\}$, the Mahalanobis distance to $x_2$ is as follows:

$$D^2(x, x_2, C_2) = (x-x_2)^T C_2^{-1}(x-x_2) \quad (10)$$
$$= \sum_{i=1}^{n} \lambda_i^{-1} [U^T(x-x_2)]^2$$

When $\lambda_i$ tends to 0, $D_2(x, x_2,C_2)$ goes to infinity, unless $U^T_0 x=0$, where $U_0=[u_{p+1}, u_{p+2}, \ldots, u_n]$. Here it is assumed, without loss of generality, that the subspace passes through the origin of the original space. Since $x_2$ resides in the subspace, $U_0^T x_2=0$.

Because $U_0^T x=0$, $d^2$ now becomes:

$$d^2 = (U_p y - x_1)^T C_1^{-1}(U_p y - x_1) + (U_p y - x_2)^T C_2^+(U_p y - x_2) \quad (11)$$

where y is a 1×p vector.

Taking derivative with respect to y yields the fusion estimator for the subspace:

$$y^* = C_{y^*} U_p^T (C_1^{-1} x_1 + C_2^+ x_2), \quad (12)$$

$$C_{y^*} = [U_p^T (C_1^{-1} + C_2^+) U_p]^{-1}. \quad (13)$$

with equivalent expressions in the original space:

$$x^* = U_p y^* = C_{x^*}(C_1^{-1} x_1 + C_2^+ x_2) \quad (14)$$

$$C_{x^*} = U_p C_{y^*} U_p^T \quad (15)$$

It can be shown that $C_{x^*}$ and $C_{y^*}$ are the corresponding covariance matrices for $x^*$ and $y^*$.

Alternatively, Eq. (12) and (13) can be written as follows:

$$y^* = (U_p^T C_1^{-1} U_p + \Lambda_p^{-1})^{-1} (U_p^T C_1^{-1} x_1 + \Lambda_p^{-1} y_2) \quad (16)$$

Here $y_2$ is the transformed coordinates of $x_2$ in the subspace spanned by $U_p$, and $\Lambda_p=\text{diag}\{\lambda_1, \lambda_2, \ldots, \lambda_p\}$. Eq. (16) can be seen as the BLUE fusion in the subspace of two Gaussian distributions, one is $N(y_2, \Lambda_p)$ and the other is the intersection of $N(x_1, C_1)$ in the subspace, $N((U^T_p C_1^{-1} U_p)^{-1} U^T_p C_1^{-1} x_1, (U^T_p C_1^{-1} U_p)^{-1})$.

The above subspace fusion provides a general formulation for (subspace) model constraining, treating the shape measurement (with heteroscedastic uncertainty) and the Principle Component Analysis (PCA) shape model as the two information sources. In the following, a third source is added that represents the dynamic prediction from tracking. The crucial benefits gained from tracking, on top of detection, are the additional information from system dynamics which governs the prediction, and the fusion of information across time. Based on the analysis above, the solution to Eq. (4) has the following form:

$$x_+ = C_{x_+}(T\{(C_{x_-} + C_x^{-1})^{-1}(C_{x_-} x_- + C_x^{-1} x)\} + C_m^+ m), \quad (17)$$

$$C_{x_+} = U_p [U_p^T (T\{(C_{x_-} + C_x^{-1})^{-1}\} + C_m^+) U_p]^{-1} U_p^T. \quad (18)$$

This solution puts information from detection, shape model, and dynamic prediction in one unified framework. When the predicted shape is also confined in a subspace, the subspace BLUE formulation described above can be applied in a nested fashion inside the transform T. The prediction $N(x_-,Cx_-)$ contains information from the system dynamics. This information is used to encode global motion trends such as expansion and contraction, and slow translation and rotation. $N(x_-,Cx_-)$ can be obtained using traditional method such as the prediction filter in a Kalman setting:

$$C_{x_-} = S C_{x_+,prev} S^T - Q. \quad (19)$$

where the system dynamics equation is $$x_- = S x_{+,prev} - q. \quad (20)$$

and Q is the covariance of q, and "prev" indicate information from the previous time step.

Figure 13:
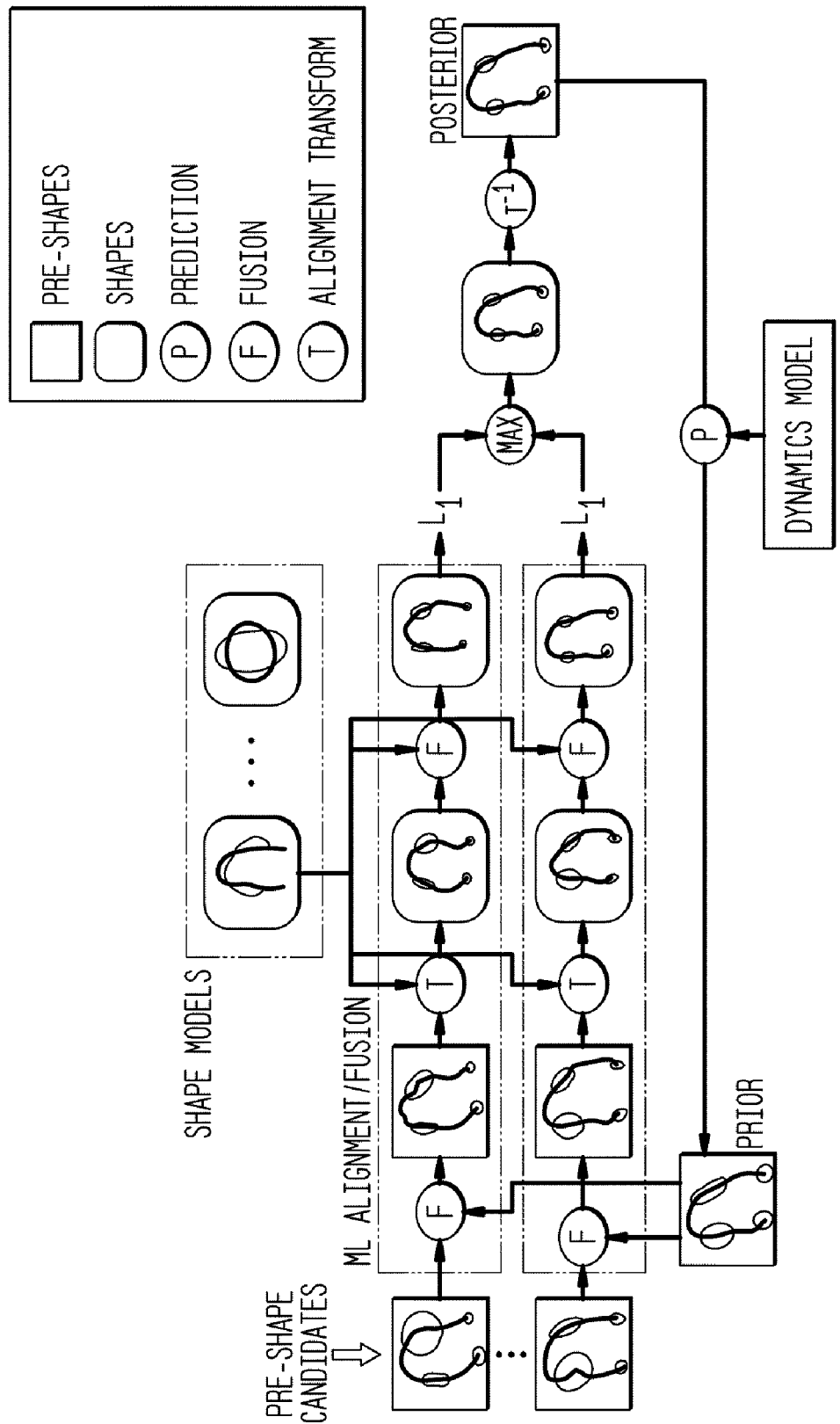
FIG. 13 illustrates uncertainty propagation during shape detection and tracking in accordance with the present invention.

FIG. 13 shows a schematic diagram of the analysis steps where the uncertainty of detection is propagated through all the steps. At each frame, multiple detection candidates are evaluated by comparing their likelihood in the context of both the shape model, and the prediction from the previous frame based on the system dynamics. Ellipses such as 1302-1316 illustrate the location uncertainties. Uncertainties are transformed with the shape during alignment and fused with the model and the predicted prior information during likelihood estimation and tracking.

Having described embodiments for a method for detecting and matching anatomical structures using appearance and shape, it is noted that modifications and variations can be made by persons skilled in the art in light of the above teachings. It is therefore to be understood that changes may be made in the particular embodiments of the invention disclosed which are within the scope and spirit of the invention as defined by the appended claims. Having thus described the invention with the details and particularity required by the patent laws, what is claimed and desired protected by Letters Patent is set forth in the appended claims.

We claim:

1. A computer-implemented method for detecting and tracking a deformable shape of a candidate object in an image, the shape being represented by a plurality of labeled control points, the method comprising:
   detecting at least one control point of the deformable shape in an image frame;
   for each control point associated with the candidate object, computing a location uncertainty matrix;
   generating a shape model to represent dynamics of the deformable shape in subsequent image frames, the shape model comprising statistical information from a training data set of images of representative objects;
   aligning the shape model to the deformable shape of the candidate object;
   fusing the shape model with the deformable shape; and
   estimating a current shape of the candidate object,
   wherein the computer-implemented method is executed by a processor.

2. The computer-implemented method of claim 1 wherein the shape model depicts the deformable shape over time.

3. The computer-implemented method of claim 1 wherein localization uncertainties of the plurality of control points are represented by covariance matrices.

4. The computer-implemented method of claim 1 wherein the shape model is represented as a single mode or a mixture of multi-normal Gaussian distributions.

5. The computer-implemented method of claim 1 wherein the location uncertainty matrix is transformed with the candidate object while aligning the shape model to the deformable shape of the candidate object.

6. The computer-implemented method of claim 1 wherein the shape model is a Gaussian model in space that is generated by concatenating coordinates of the control points.

7. The computer-implemented method of claim 1 wherein aligning the shape model to the deformable shape of the candidate object further comprises:
   matching the control points of the candidate object to corresponding control points of a mean shape of the training set.

8. The computer-implemented method of claim 7 wherein matching the control points further comprises:
   transforming an orientation of the candidate object to a same orientation of the mean shape.

9. The computer-implemented method of claim 8 wherein the transformation includes translation of the image of the candidate object.

10. The computer-implemented method of claim 8 wherein the transformation includes rotation of the image of the candidate object.

11. The computer-implemented method of claim 8 wherein the transformation includes scaling of the image of the candidate object.

12. The computer-implemented method of claim 1 wherein aligning the shape model to the deformable shape of the candidate object takes into account the location uncertainty matrix.

13. The computer-implemented method of claim 12 wherein a weighted least squares formulation is used, where the weighting matrix is determined by the location uncertainty matrix.

14. A system for detecting and tracking a deformable shape of a candidate object in an image, the shape being represented by a plurality of labeled control points, the system comprising:
   means for detecting at least one control point of the deformable shape in an image frame;
   means for computing a location uncertainty matrix for each control point associated with the candidate object;
   means for generating a shape model to represent dynamics of the deformable shape in subsequent image frames, the shape model comprising statistical information from a training data set of images of representative objects;
   means for aligning the shape model to the deformable shape of the candidate object;
   means for fusing the shape model with the deformable shape; and
   means for estimating a current shape of the candidate object.

15. The system of claim 4 wherein the shape model depicts the deformable shape over time.

16. The system of claim 14 wherein localization uncertainties of the plurality of control points are represented by covariance matrices.

17. The system of claim 14 wherein the shape model is represented as a single mode or a mixture of multi-normal Gaussian distributions.

18. The system of claim 14 wherein the location uncertainty matrix is transformed with the candidate object while aligning the shape model to the deformable shape of the candidate object.

19. The system of claim 14 wherein the shape model is a Gaussian model in space that is generated by concatenating coordinates of the control points.

20. The system of claim 14 wherein said means for aligning further comprises:
   means for matching the control points of the candidate object to corresponding control points of a mean shape of the training set.

21. The system of claim 20 wherein the means for matching control points further comprises:
   means for transforming an orientation of the candidate object to a same orientation of the mean shape.

22. The system of claim 21 wherein the transformation includes translation of the image of the candidate object.

23. The system of claim 21 wherein the transformation includes rotation of the image of the candidate object.

24. The system of claim 21 wherein the transformation includes scaling of the image of the candidate object.

25. The system of claim 14 wherein said means for aligning takes into account the location uncertainty matrix.

26. The system of claim 25 wherein a weighted least squares formulation is used, where the weighting matrix is determined by the location uncertainty matrix.

27. A method for detecting and tracking a deformable shape of a candidate left ventricle of a heart in an image, the shape being represented by a plurality of labeled control points, the method comprising:
  detecting at least one control point of the deformable shape in an image frame;
  for each control point associated with the candidate left ventricle, computing a location uncertainty matrix;
  generating a shape model to represent dynamics of the deformable shape in subsequent image frames, the shape model comprising statistical information from a training data set of images of representative left ventricles;
  aligning the shape model to the deformable shape of the candidate left ventricle;
  fusing the shape model with the deformable shape; and
  estimating a current shape of the candidate left ventricle.

* * * * *